O. R. MASON.
Devices for Thawing Ice from Water or Gas Pipes.
No. 142,488. Patented September 2, 1873.
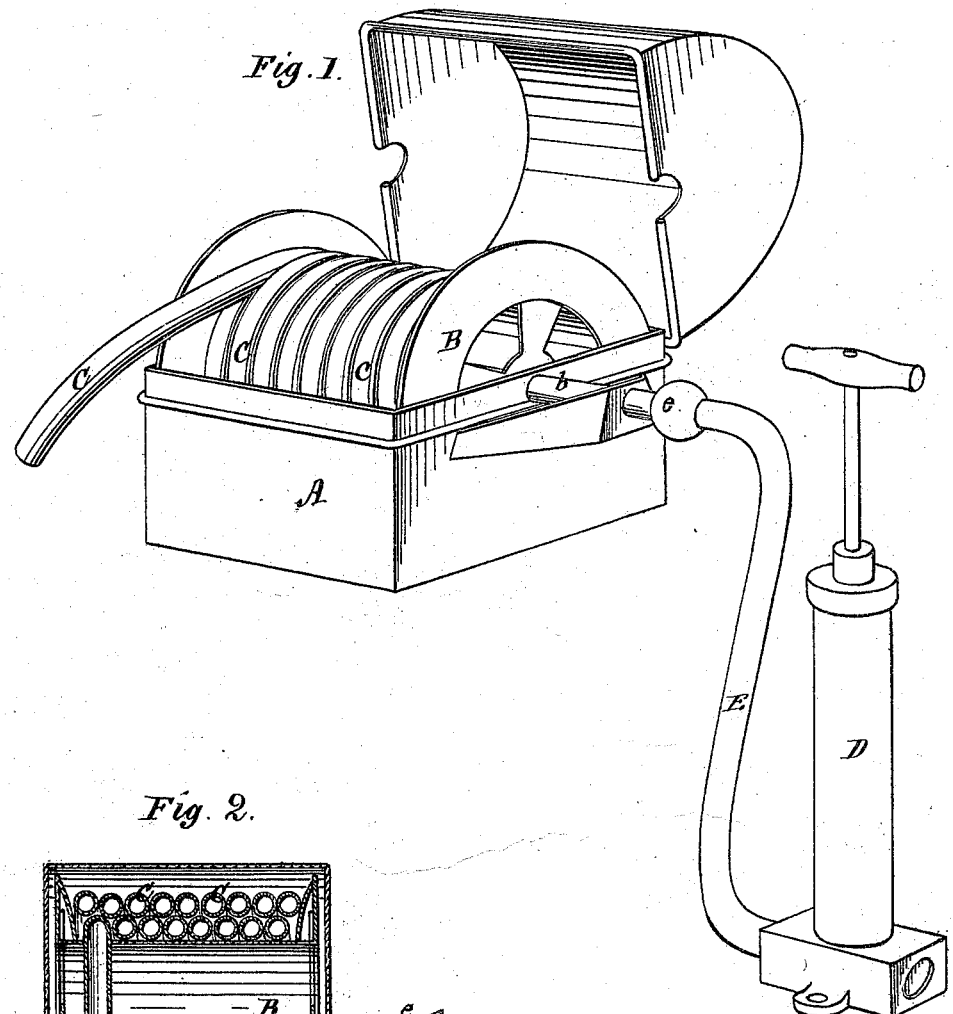
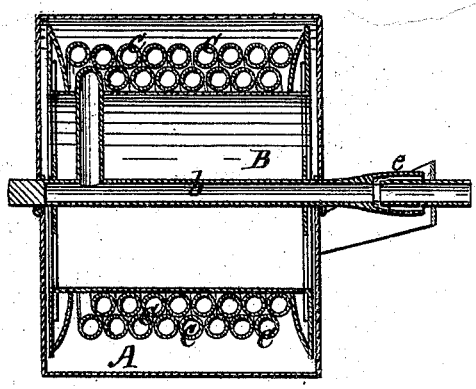
Witnesses.
Charles Barker
Wm E. Chaffee
Inventor
Orrin R Mason
by H H Doubleday
atty

UNITED STATES PATENT OFFICE.

ORRIN R. MASON, OF BINGHAMTON, NEW YORK.

IMPROVEMENT IN DEVICES FOR THAWING ICE FROM WATER OR GAS PIPES.

Specification forming part of Letters Patent No. 142,488, dated September 2, 1873; application filed May 10, 1873.

*To all whom it may concern:*

Be it known that I, ORRIN R. MASON, of Binghamton, in the county of Broome and State of New York, have invented certain new and useful Improvements in Devices for Thawing Ice from Water and Gas Pipes; and I do hereby declare the following to be a full, clear, and exact description of the invention, such as will enable others skilled in the art to which it pertains to make and use it, reference being had to the accompanying drawings, which form part of this specification.

Figure 1 is a perspective view of devices adapted for carrying my invention into effect. Fig. 2 is a vertical section.

The object of my invention is to produce a convenient compact device, by means of which a jet or stream of heated fluid may be injected against the frozen contents of a water or gas pipe. To this end the invention consists in combining a flexible pipe with a revolving reel or drum, the pipe being coiled upon the drum, the construction of parts being such that the heated fluid can be forced through said drum and any desired length of pipe.

In the accompanying drawings, A represents a box or other suitable vessel, made by preference water-tight. B is a reel or drum, mounted on a shaft, $b$, which rotates freely in bearings in or upon the sides of the box A. The shaft $b$ is hollow, at least a part of its length, for a purpose which will soon be explained. C is a flexible pipe, of lead or other suitable material, coiled upon the drum B, one end of the pipe being connected with the hollow portion of the shaft $b$, as at $e$, Fig. 2. D is a force-pump. E is a pipe connecting force-pump D with the open end of shaft $b$.

By preference I make the joint which unites the pipe E with the shaft in the form of a ball and socket, in order that there may be perfect freedom of movement at this point without leakage; although, under ordinary circumstances, any desired form of coupling may be employed which will permit the rotation of the drum or reel.

The operation of the device is as follows: The force-pump, having been placed in a pail or other vessel containing hot water, is used to force a stream of the hot liquid through the coiled pipe C, the open end of this pipe being thrust into the frozen water or gas pipe. As the thawing out progresses the stream of hot water can be made to follow up closely by unwinding the pipe C from the drum; thus the heat can be applied just where the work is to be done.

When preferred, the force-pump may be permanently placed inside the box A, and the supply of hot water poured into said box. This arrangement will frequently be found convenient when a person desires to operate it alone.

It is evident that a reservoir of steam might be connected with the open end of shaft $b$, and carried into the water or gas pipe in the same manner as I introduce water through the pipe D.

What I claim as new is—

The combination of the flexible pipe C with the reel or drum B, having the hollow shaft $b$ and coupling $e$, through which the fluid is delivered to the pipe, substantially as described.

In testimony that I claim the foregoing I have hereunto set my hand this 31st day of March, 1873.

ORRIN R. MASON.

Witnesses:
CHAS. O. ROOT,
JAMES W. DOUBLEDAY.